United States Patent [19]

Bouthillier

[11] Patent Number: 5,063,880
[45] Date of Patent: Nov. 12, 1991

[54] AUTOMATIC SPRAYING DEVICE FOR FARM ANIMALS

[75] Inventor: Rock J. Bouthillier, Montreal, Canada

[73] Assignee: Bug Atomateck Inc., St-Hubert, Canada

[21] Appl. No.: 623,105

[22] Filed: Dec. 3, 1990

[51] Int. Cl.⁵ .............................................. A01K 29/00
[52] U.S. Cl. .................................... 119/159; 119/156
[58] Field of Search ................ 119/156, 158, 159, 160

[56] References Cited

U.S. PATENT DOCUMENTS

| 4,342,285 | 8/1982 | James | 119/159 X |
| 4,379,440 | 4/1983 | Thedford et al. | 119/159 |
| 4,478,176 | 10/1984 | James | 119/159 |
| 4,987,861 | 1/1991 | Lemire et al. | 119/159 |

Primary Examiner—Gene Mancene
Assistant Examiner—R. Thomas Price

[57] ABSTRACT

An automatic spraying device for farm animals, the device being comprised of a framework defining a passage through which farm animals are directed one-by-one. An electronic detection device is associated with the passage and connected to a control circuit to provide a detection signal thereto when a farm animal enters the passage. Spray nozzles are oriented with respect to the passage to spray animals passing through the passage. A pump is provided to supply a chemically treated liquid to the spray nozzles under pressure. The pump is actuated by the control circuit upon reception of the detection signal. One or more valves are connected to the spray nozzles and a liquid reservoir, containing the chemically treated liquid, is connected to the pump. A pump deactuation circuit including a timing circuit is provided to deactuate the pump after a predetermined time lapse after reception of a valve closing signal where the valve is closed to shut off the spray nozzles.

4 Claims, 3 Drawing Sheets

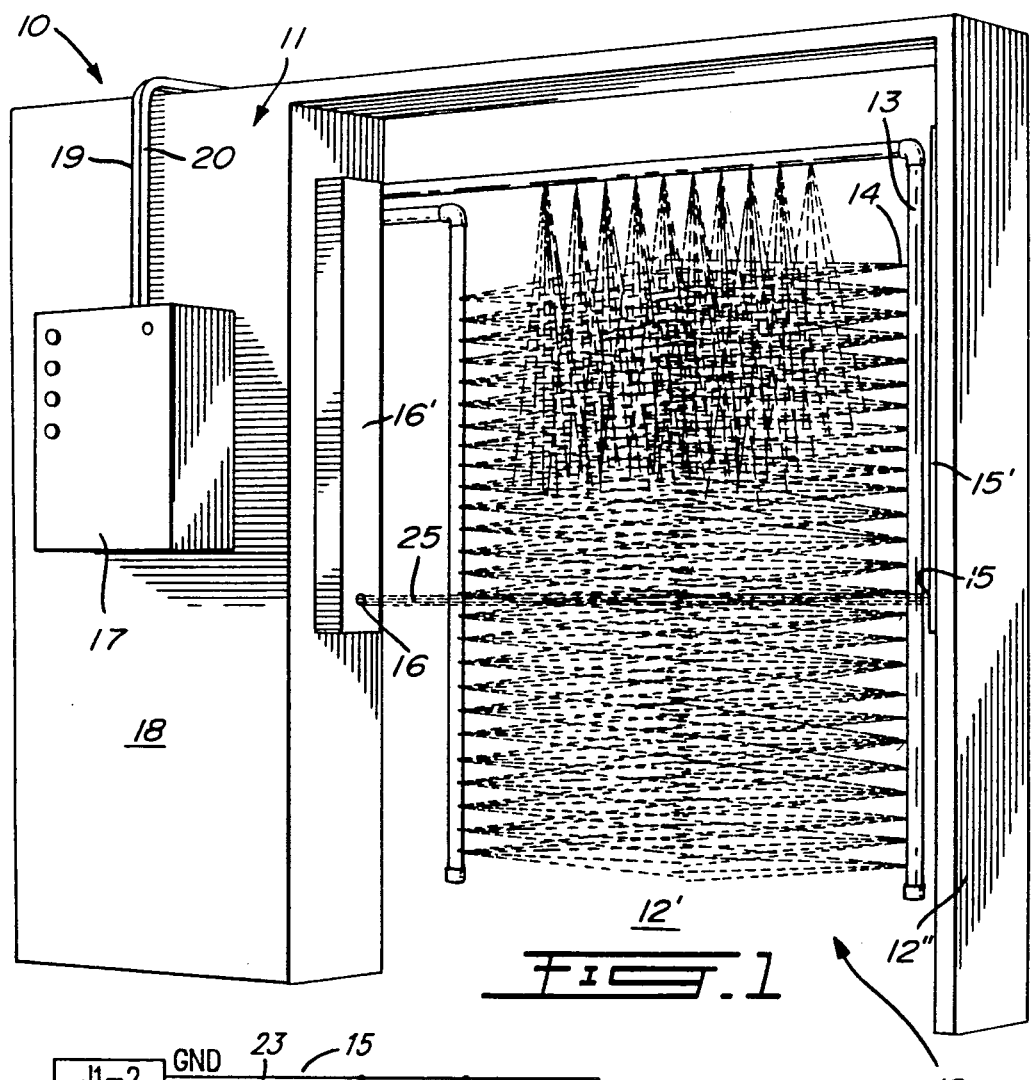
Fig. 1
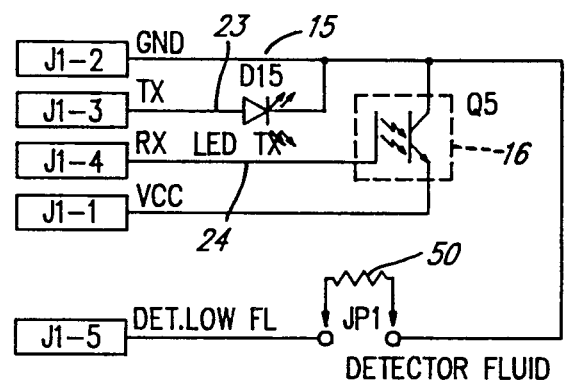
Fig. 3
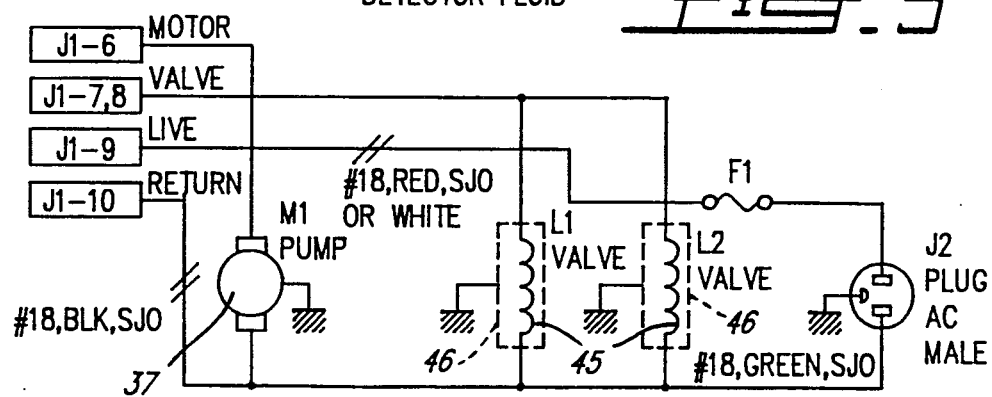

AUTOMATIC SPRAYING DEVICE FOR FARM ANIMALS

BACKGROUND OF INVENTION

1. Field of the Invention

The present invention relates to an automatic spraying device for farm animals and wherein the animals are sprayed automatically when passing through a defined passageway.

2. Description of Prior Art

Various devices are known to spray animals with a disinfectant or insecticide liquid so as to kill various types of flies that lodge themselves in the hair or skin of the animals. However, many of these treatments are not totally effective for the reason that they do not provide complete spraying of the animals and often these treatments are given in feed areas where the insecticide will also be sprayed within the feedstock of the animal. Thus, some of these chemicals can find their way, for example, in the milk of cows and the milk has to be discarded. Also, most spraying devices are constructed for occasional use only when livestock is found to contain infectuous flies.

Experiments have also proven that if cows are bothered by flies during grazing, the flies will affect the rate at which they graze and the cows will produce 5 to 20% less milk than if they are not bothered by flies. The spraying of farm animals with hand-held devices has also proven to be time-consuming and often the livestock is not sprayed uniformly. Various animal-operated sprayers have been devised in an attempt to solve these problems and such are, for example, described in U.S. Pat. Nos. 3,884,192; 3,183,890; 4,580,529 and 4,478,176. All of these Patents describe devices with various mechanisms that trigger automatic spraying of animals. The present invention relates to such devices and attempts to solve their various deficiencies.

SUMMARY OF INVENTION

It is, therefore, an object of the present invention to provide an automatic spraying device for farm animals which substantially overcomes all of the above-mentioned disadvantages of the prior art.

Another feature of the present invention is to provide an automatic spraying device for farm animals and wherein the device is fully automatic and controlled by electronic control circuits to operate valves and a pump automatically and which requires very little servicing.

Another feature of the present invention is to provide an automatic spraying device for farm animals wherein the animals are sprayed on a continuous basis when the animals enter or leave predetermined areas which are remote from feed areas.

According to the above objects, from a broad aspect, the present invention provides an automatic spraying device for farm animals. The device comprises a framework defining a passage through which farm animals are directed one-by-one. Electronic detection means is associated with the passage and connected to electronic control circuit means to provide a detection signal thereto when a farm animal enters the passage. Spray nozzles are oriented with respect to the passage to spray animals passing through the passage. Pump means is provided to supply a chemically treated liquid to the spray nozzles under pressure. The pump means is actuated by the control circuit upon reception of the detection signal. Valve means is provided to connect the pump to the spray nozzles. A chemically treated liquid reservoir is connected to the pump means. An automatic pump deactuation means, including timing means, is also provided to deactuate the pump means after a predetermined time lapse after reception of a valve closing signal where the valve means is closed to shut off the spray nozzles.

BRIEF DESCRIPTION OF DRAWINGS

A preferred embodiment of the present invention will now be described with reference to the accompanying drawings in which:

FIG. 1 is a perspective view showing the construction of a framework defining a passage in which the farm animals are sprayed;

FIG. 3 is a schematic diagram showing the interconnection of the detecting devices as well as the pump and the control valves.

DESCRIPTION OF PREFERRED EMBODIMENTS

Figure 2A:
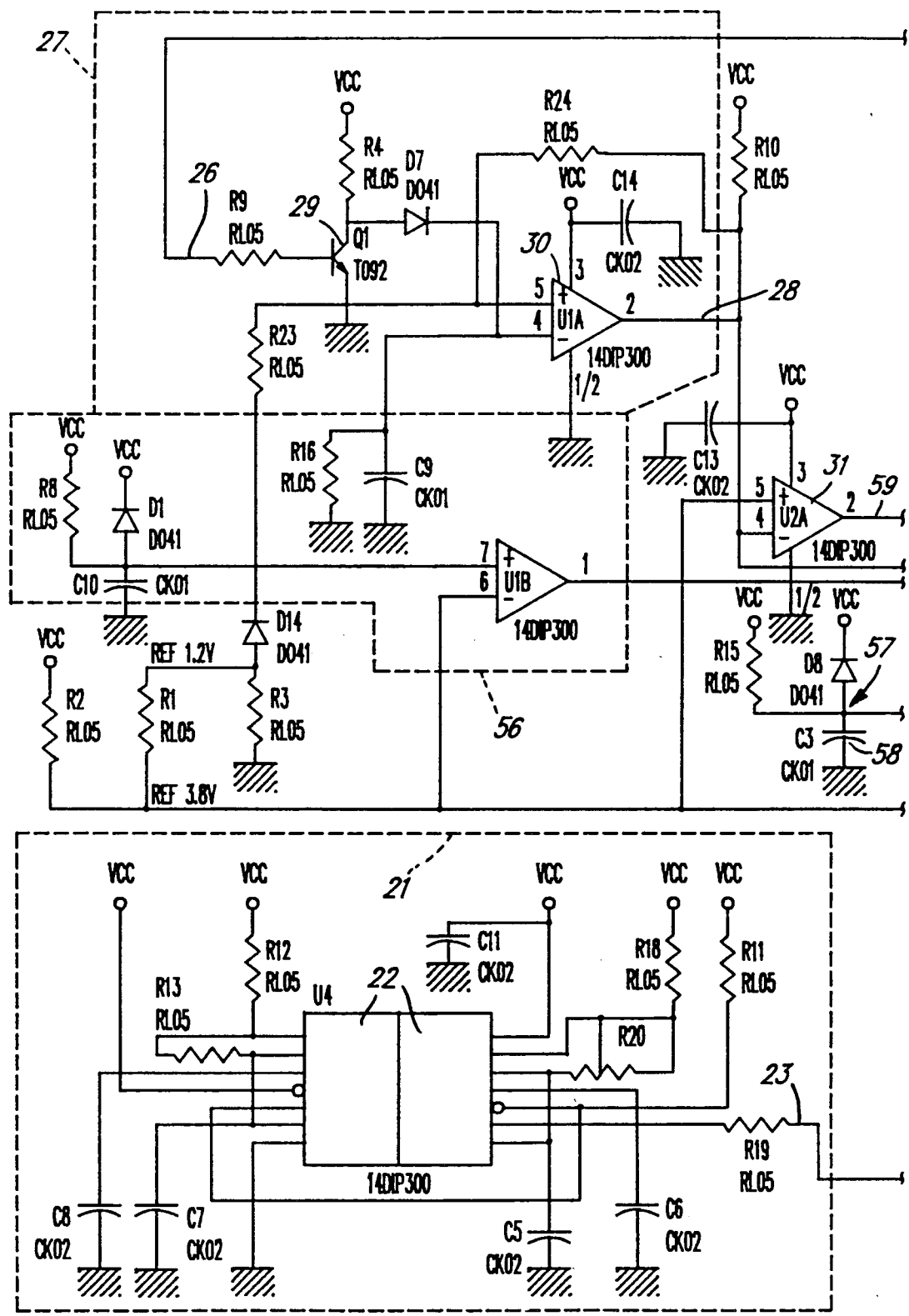
FIGS. 2A and 2B are schematic diagrams illustrating the construction of the electronically controlled circuit.

Referring now to the drawings, and more particularly to FIG. 1, there is shown generally at 10, the automatic spraying device of the present invention. The device comprises a framework 11 which defines therein a passageway 12 through which farm animals are directed, one-by-one, such as when they leave the stables for outside grazing or else when they enter a stable area. It is well known that cows will follow one another instinctively when leaving or returning to their stable. The equipment is located away from feedstock so that the chemically treated liquid which is sprayed on the animals does not mix with the feedstock. By spraying the animals with an insecticide liquid, the animals are not disturbed by flies during grazing and accordingly will take in more feed and thus provide more milk.

The passageway is provided with an inlet opening 12' and an outlet opening 12" and between which is defined a passageway in which conduits 13 having spray nozzles 14 are disposed. These conduits 13 are fed with a chemically treated liquid under pressure by a pump, as will be described later, which is actuated by a detection signal which is generated by an electronic detection means such as the infrared transmitter 15 and the infrared receiver 16 mounted on opposed sides of the inlet opening 12'. The transmitter 15 and receiver 16 can be mounted on the inlet and outlet openings 12' and 12" or simply on an inlet opening, as desired. Accordingly, animals can be sprayed when leaving and/or entering their stable or any other designated area. A control panel 17 is mounted on a wall 18 associated with the framework 10. The panel 17 also has a reservoir therein which can be automatically fed a chemical insecticide through a feed line 19 and an admixture of water through feed line 20. These feed lines are each connected to pumps (not shown) which are actuated when the level of liquid in the reservoir goes below a predetermined level so as to supply a predetermined quantity of chemical and water so that the device can continuously operate automatically.

Figure 2B:
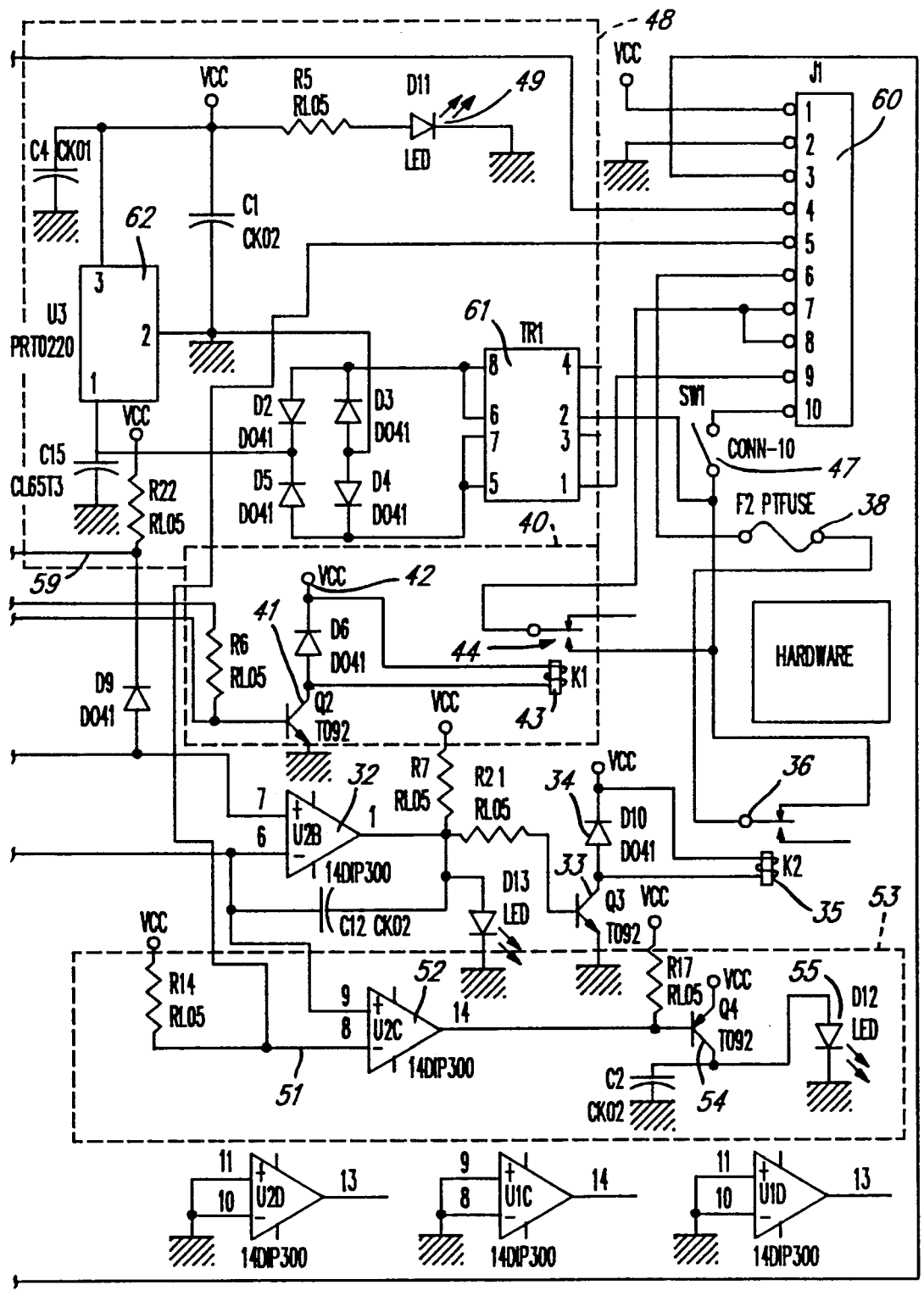

Referring now additionally to FIGS. 2 and 3, there will be described the operation of the device and the construction of its electronic control circuit. As shown in FIG. 3, the infrared transmitter 15 is a light emitting diode which is fed by an infrared emitter circuit 21 in FIG. 1. This emitter utilizes two chronometers 22 to provide a pilot signal on its output 23 which is connected to the light emitting diode 16 to transmit a tonality. An infrared receiver transistor 16 receives the infrared signal from the transmitter 15 and provides at its output connection 24 a detection signal when the light beam 25 (FIG. 1) is interrupted by a farm animal crossing the entrance opening. Of course, the transmitter and receiver housings 15' and 16' can be located at different heights or levels within the opening depending on the type of farm animals to be sprayed. For example, if the livestock consists of pigs, then the detectors would be located much lower in the opening.

The detection signal at the output 24 of infrared receiver 16 is connected to the input 26 of an amplifier circuit 27 which generates at its output 28 a valve closing signal. The amplifier circuit 27 consists of an inverter transistor 29 connected to an input gate of an operational amplifier 30, the output 28 of which provides the valve closing signal. The valve closing signal drives a further integrated circuit 31 which constitutes the pump drive and this circuit is connected at its output to a further integrated circuit 32 which provides the biasing signal to the current amplifier transistor 33 to bias the diode 34 conductive and provide the energizing current to the relay coil 35 thereby energizing the coil to cause a switching action of the switch 36 to in turn provide a supply to the pump 37 (FIG. 3). A fuse 38 protects the pump from voltage surges.

The valve closing signal at the output 28 of the integrated circuit 30 is also connected to a valve closing circuit 40 and more particularly to the base of a further D.C. current amplifier transistor 41 whereby to provide the supply to the coil 43 of a further relay 44. This contact provides the supply across the coils 45 of the two valves 46 which are connected to the piping 13 to open the conduits between the pump and the piping whereby to supply chemically treated liquid therein under pressure to spray the animal which has just interrupted the infrared beam.

The ON/OFF switch 47 is connected in the supply line to the valves to interrupt the pump should it be necessary to shut off the device. The supply is provided by the supply circuit 48 to generate a 5-volt regulated, one-amp supply to the circuit components. A light emitting diode 49 indicates if the supply is on or off. A sensor 50 is associated with the liquid reservoir and provides a ohmic signal to indicate the level of the liquid in the liquid reservoir. This signal is connected to the input 51 of an amplifier 52 forming part of a liquid level detector circuit 53. This amplifier 52 biases the transistor 54 conductive upon reaching a predetermined value which in turn connects the 4.8 volts to the anode of the light emitting diode 55. This provides an indication that the level is low and that more liquid is to be supplied to the reservoir. This supply can be done automatically, as previously described, by connecting this alarm signal to proper actuation circuitry (not shown) or else the supply can be done manually by an operator but only when the signal light is on.

The circuit 56 constitutes a reset circuit which maintains the circuit components in their stable logic state. An important circuit in the system is the time delay circuit 57 which includes a charging capacitor 58 which is connected to the output 59 of the integrated circuit 31 to which is fed the valve closing signal from the output 28 of the amplifier 30. This capacitor 58 is connected in series with a discharging diode 57 to discharge the capacitor rapidly after a predetermined charge and this provides for a time delay of approximately two minutes after the capacitor starts charging. This state occurs immediately after the infrared beam reappears after being obstructed thereby providing a valve closing signal or a valve closing state at the output 28 of the amplifier 30. After this predetermined charging time, the capacitor discharges and thereby renders the transistor amplifier 33 non-conductive thereby causing the relay coil 35 to deenergize to cut the supply to the pump. Accordingly, the equipment shuts off automatically. The nozzles are only operated when the valves are open and these valves immediately close upon the reappearance of the infrared beam.

The following description is a definition of the components as appearing in the schematic diagrams of FIGS. 2 and 3 and may help in providing a better understanding of the construction and operation of these circuits. Resistors R1, R2 and R3 are voltage dividers to provide proper reference voltages of 1.2 volts and 3.8 volts. Resistor R4 acts as a pull-up resistor on the collector of transistor Q1. Resistor R5 is a current limiting resistor for diode D11. Resistor R6 is also a current limiting resistor for the base of Q2. Resistor R7 is a pull-up resistor for the operational amplifier 32 and connected to pin 1 of the integrated circuit. Resistor R8 is a charging resistor for the capacitor C10. Resistor R9 is a current limiting resistor for the base of transistor 29. Resistor R10 is a pull-up resistor for the operational amplifier 30 and is connected to the pin 2 of that amplifier. Resistor R11 is pull-up resistor for the integrated circuit Q4 and connected to pins 5 and 10. Resistors R12 and R13 are charging resistors for capacitor C7. Resistor R14 is a pull-up resistor for the operational amplifier 52 and connected to pin 8 thereof. This resistor also serves to provide the proper sensitivity to the liquid level detector. Resistor R15 is a charging resistor for the time delay capacitor 58. Resistor R16 is a charging resistor for capacitor C9. Resistor R17 is a pull-up resistor for the operational amplifier 52 and connected to pin 14 thereof. Resistor R18 is a charging resistor for capacitor C5. Resistor R19 is a current limiting resistor for the light emitting transmitter diode 15. Resistor R20 is a variable resistance for the discharge of capacitor C5. Resistor R21 is a current limiting resistor for the base of transistor 33. Resistor R22 is a pull-up resistor for the operational amplifier 31 and connected to pin 2 thereof. Resistor R23 is the input resistor for the operational amplifier 30 and connected to pin 5 thereof. Resistor R24 is the feedback resistor and also connected to the same pin of the amplifier 30.

The diode D1 is utilized to rapidly discharge the capacitor C10. Diodes D2, D3, D4 and D5 are voltage rectification diodes for the D.C. supply. Diode D6 is provided to eliminate negative supply transients provided by relay 44 when deactivated. Diode D7 filters the signal for the D.C. level. Diode D8 is a rapid discharge diode 57 for capacitor C3 which is the charging capacitor 58 for the delay circuit. Diode D9 is also utilized for the rapid discharge of the capacitor 58 in accordance with the level at the output 59 of the amplifier 31. Diode D10 eliminates the negative supply transients which are generated when relay 35 is deactivated. Light emitting diode D13 emits a yellow light to indicate a standby condition. Diode D14 is provided as an isolation element. Capacitors C1 and C2 eliminate high frequency transients in the circuit. Capacitor C4 is utilized for regulation and for filtration of the D.C. supply. Capacitor C5 is utilized for the 40 Hertz supply. Capacitor C6 also eliminates high frequency transients. Capacitor C7 is utilized for the 1,000 Hertz frequency. Capacitor C8 also eliminates high frequency transients while capacitor C9 is utilized to provide a time base of 0.55 seconds. Capacitor C10 is utilized for a time base of approximately 1.5 seconds. Capacitor C11 eliminates the transients at high frequency for the integrated circuit. Capacitor C12 is utilized as a positive feedback capacitor. Capacitors C13 and C14 also eliminate the high frequency transients for the integrated circuit. Capacitor C15 is utilized to filter the D.C. level before regulation.

The pin connector 60 has ten pins providing a quick connection and disconnection of the printed circuit board to which the various components of the control circuits are connected. The transformer 61 is a voltage reduction transformer for the 120-volt A.C. supply connected thereto by the closing of the ON/OFF switch 47 and provides a 16-volt A.C. output. The voltage regulator 62 provides the 5-volt regulated D.C. supply.

It is within the ambit of the present invention to cover any obvious modifications of the preferred embodiment described herein provided such modifications fall within the scope of the appended claims.

I claim:

1. An automatic spraying device for farm animals, said device comprising a framework defining a passage through which farm animals are directed one-by-one, electronic detection means associated with said passage and connected to electronic control circuit means to provide a detection signal thereto when a farm animal enters said passage, spray nozzles oriented with respect to said passage to spray animals passing through said passage, pump means to supply a chemically treated liquid to said spray nozzles under pressure, said pump means being actuated by said control circuit means upon reception of said detection signal, valve means to connect said pump means to said spray nozzles, a chemically treated liquid reservoir connected to said pump means, automatic pump deactuation means including timing means to deactuate said pump means after a predetermined time lapse after reception of a valve closing signal where said valve means is closed to shut off said spray nozzles, sensing means in said reservoir and connected to said control circuit means to indicate the level of liquid in said reservoir when said liquid reaches a predetermined level, said sensing means comprises a variable resistance sensing element providing a level indication signal to an integrated circuit which provides a biasing signal to a D.C. current amplifier transistor which drives a light emitting diode to indicate that a predetermined low liquid level has been reached in said reservoir, said detection means being comprised of an infrared transmitter and receiver spaced apart across said inlet opening to generate an infrared beam across said inlet opening, said detection signal being generated by said receiver when said beam is obstructed, said valve closing signal being constituted by the return of said obstructed beam, said detection signal providing a control signal to bias a D.C. current amplifier transistor to actuate a control relay to open a valve of said valve means, said control signal also biasing a further D.C. current amplifier transistor to actuate a further control relay to connect a supply to said pump means to make same operational, said further D.C. current amplifier transistor being connected to a standby circuit having a time delay circuit which is deactuated by the presence of said control signal, said time delay circuit being comprised of a charging capacitor connected to an integrated circuit which controls said further D.C. current amplifier transistor to deenergize said further control relay to remove the supply to said pump means.

2. An automatic animal spraying device as claimed in claim 1 wherein said passage has an inlet opening and an outlet opening spaced therefrom, said detection means being associated with said inlet opening.

3. An automatic animal spraying device as claimed in claim 1 wherein said chemically treated liquid is an insecticide liquid.

4. An automatic animal spraying device as claimed in claim 1 wherein said infrared transmitter and receiver are disposed across said inlet opening to permit said beam to be located at a desired level depending on the type of animals being treated.

* * * * *